United States Patent Office 3,440,265
Patented Apr. 22, 1969

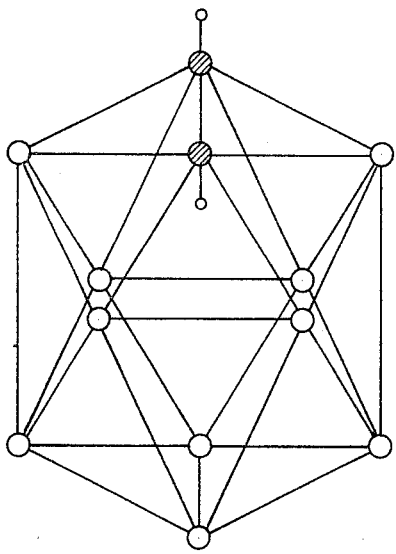
FORMULA I
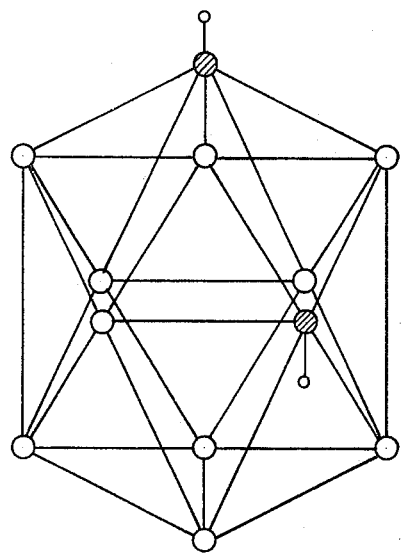
FORMULA II
○ BORON
◉ CARBON
o HYDROGEN ON CARBON (HYDROGEN ATOMS ON BORON OMITTED FOR CLARITY)
THEODORE L. HEYING
STELVIO PAPETTI
INVENTORS.
BY Walter D. Hunter
AGENT

3,440,265
PROCESS OF PREPARING ORGANOSILYL-
CONTAINING m-CARBORANES
Theodore L. Heying, North Haven, and Stelvio Papetti,
Hamden, Conn., assignors to Olin Mathieson Chemical
Corporation, a corporation of Virginia
Filed Aug. 31, 1966, Ser. No. 576,404
Int. Cl. C07f 7/12, 5/02; C08g 31/16
U.S. Cl. 260—448.2                           4 Claims

ABSTRACT OF THE DISCLOSURE

Silicon-containing m-carboranes are prepared by heating silicon-containing o-carboranes at a temperature of about 290° C. to 375° C. The resulting compounds can be reacted with bis(chlorodimethylsilyl)-m-carborane with bis(methyloxydimethylsilyl)-m-carboranes in the presence of anhydrous ferric chloride to form polymers suitable for use in high temperature and high pressure application.

---

This invention relates to a process for the preparation of silicon-containing m-carboranes. More particularly, this invention relates to a process in which bis(halodialkyl or aryl-silyl)-o-carboranes are isomerized to the corresponding bis(halodialkyl or aryl-silyl)-m-carborane by heating at elevated temperatures.

Ortho-carborane compounds suitable as starting materials in the process of this invention are compounds with melting points below 290° C. having the formula:

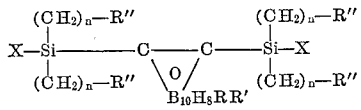

wherein X is a halogen selected from the group consisting of chlorine, fluorine, bromine and iodine; R and R' are each selected from the group consisting of hydrogen and alkyl of from 1 to 5 carbon atoms; R'' is selected from the group consisting of alkyl of from 1 to 12 carbon atoms and the radical:

wherein R''' is selected from the group consisting of hydrogen and alkyl of from 1 to 5 carbon atoms; $n$ is an integer of from 0 to 1 inclusive, and with the proviso that when $n$ is 0 then R'' is alkyl.

The o-carborane starting materials of the process of this invention (i.e., the ortho-carboranes) are derivatives of the compound o-carborane which has the structural formula shown in the figure as Formula I while the structural formula of m-carborane (i.e., meta-carborane) is shown as Formula II in the figure.

Bis(halodialkyl or aryl-silyl)-o-carboranes useful as starting materials in the process of this invention can be made by the method set forth in Papetti application S.N. 310,379, filed Sept. 20, 1963, for Compound and Process, now U.S. Patent 3,366,656. For example, the compound bis(chlorodimethylsilyl)-o-carborane can be prepared by first reacting o-carborane and butyl lithium to form dilithio-o-carborane and, in a second step, reacting the thus prepared dilithio-o-carborane with dichlorodimethylsilane. Suitable bis(halodialkyl or aryl-silyl)-o-carboranes are, for example, bis(chlorodimethylsilyl)-o-carborane, bis(chloromethylethylsilyl)-o-carborane, bis(chlorodiethylsilyl)-ethyl-o-carborane, bis(chloromethyldiisopropylsilyl)-o-carborane, bis(chloro-n-propylmethylsilyl)-o-carborane, bis(chlorodi-n-propylsilyl)-o-carborane, bis(chlorodihexylsilyl)-o-carborane, bis(chlorodiamylphenylsilyl)-o-carborane, bis(chlorodiphenylsilyl)-o-carborane, bis(chlorodibenzylsilyl)-o-carborane, bis(chloro-n-octyldodecylsilyl)-o-carborane and the corresponding fluorine, bromine and iodine derivatives.

In the process of this invention bis(halodialkyl or aryl-silyl)-m-carboranes are prepared by heating a silicon-containing o-carborane compound of the type mentioned above at a temperature of from about 290° C. to 375° C. Although the reaction can be carried out conveniently at atmospheric pressure, if desired, pressures as high as about 100 p.s.i. can be employed. Preferably, for those o-carborane starting compounds having boiling points between about 290° C. to about 375° C., the isomerization reaction is conducted at reflux temperature. The time of the isomerization reaction will vary with the temperature and with the particular starting material and other reaction conditions employed and generally will be between about 0.25 to 30 hours or more.

The bis(halodialkyl or aryl-silyl)-m-carborane compounds of this invention are useful in the preparation of high temperature resistant polymers as set forth in application S.N. 361,408, filed Apr. 21, 1964, in the names of Heying et al., now U.S. Patent 3,388,090. For example, high temperature resistant polymers can be prepared by reacting equimolar quantities of bis(methoxydimethylsilyl)-m-carborane with bis(chlorodimethylsilyl)-m-carborane in the presence of anhydrous ferric chloride at a temperature of 160° C. for about 30 minutes. The polymer thus produced can be mixed with from about 50 to about 150 percent by weight, based on the weight of the polymer, of an inorganic filler such as iron oxide, silica fiber, asbestos, etc. and then cured through cross-linking by heating under pressure for about 4 to about 24 hours or more in the presence of a catalyst such as benzolyl peroxide to yield products suitable for use in high temperature and high pressure applications for materials such as gaskets or bushings. These products, when heated to temperatures above 450° C. show only slight gas evolution and, in addition, they possess a high degree of resistance to solvent action.

The following examples illustrate various embodiments of this invention and are to be considered not limitative:

EXAMPLE I

In a 25 ml., round bottom flask equipped with magnetic stirrer, reflux condenser, nitrogen inlet line, and connected to a bubble-off, 4.0 g. of bis(chlorodimethylsilyl)-o-carborane was heated to reflux.

After three hours of refluxing, the product was cooled to ambient temperature. Approximately a third of the product solidified after it was kept at —5° C. for about one hour indicating that some of the ortho derivative, i.e., bis(chlorodimethylsilyl)-o-carborane, was still present (o-derivative M.P. 112.5–3.5°; m-derivative, liquid). Then this intermediate product was heated again overnight for a total heating time of 20 hours.

Infrared analysis of the final product showed it to be essentially pure bis(chlorodimethylsilyl)-m-carborane. The product distilled in practically quantitative yield under vacuum at an oil bath temperature of 150° C. For further proof of the meta isomer formation, a sample of this material was hydrolyzed in acetone solution to give bis(hydroxydimethylsilyl)-m-carborane which was identified by infrared analysis and by melting point (97–9° C.).

EXAMPLE II

In this experiment 141 g. of bis(chlorodimethylsilyl)-o-carborane was refluxed in a 300 ml. flask for 24 hours. The crude product was distilled under reduced pressure yielding as bis(chlorodimethylsilyl)-m-carborane (97.1 percent of theoretical) which was identified by infrared analysis.

As in Example I, a sample of the product was hydrolyzed to give the corresponding bis(hydroxydimethylsilyl)-m-carborane as identified by infrared analysis.

EXAMPLE III

In this experiment 200 g. of bis(chlorodimethylsilyl)-o-carborane was isomerized in a 500 ml. flask. The starting material was refluxed for five days. Analysis of a sample of the product by vapor phase chromatography indicated the presence of 10.5 percent by weight of the para isomer together with the bis(chlorodimethylsilyl-m-carborane.

When this intermediate product was further refluxed, for a total of eleven days, the concentration of the para isomer rose to 12.6 percent.

EXAMPLE IV

A micro glass autoclave constructed from a capillary tube was vacuum dried for 20 hours, flushed with nitrogen and filled under nitrogen with $70 \pm 15$ mg. of bis(chlorodimethylsilyl)-o-carborane following which the autoclave was sealed at a point 25 to 35 mm. from the bottom. The autoclave and contents were heated at a temperature of 329° C. for 1440 minutes. At the end of that time the contents of the autoclave were removed by syringe after being dissolved in 20 microliters of distilled benzene previously dried over calcium hydride. By chromatographic analysis of the total sample it was determined that the mole fraction of bis(chlorodimethylsilyl)-m-carborane was 0.997 indicating that an essentially quantitative yield of the desired product had been achieved.

EXAMPLES V–VII

Examples V–VII were conducted in the same manner as Example IV except that different temperatures were employed. Pertinent details relating to these examples are shown in Table 1 which follows:

| Example | Heating time (minutes) | Temperature (° C.) | Weight of charge [1] mg. | Mole fraction of A[2] in product |
|---|---|---|---|---|
| V | 570 | 335 | 70±15 | 0.955 |
| VI | 240 | 345 | 70±15 | 0.973 |
| VII | 150 | 365 | 70±15 | 0.973 |

[1] Bis(chlorodimethylsilyl)-o-carborane.
[2] Mole fraction of bis(chlorodimethylsilyl)-m-carborane.

What is claimed is:

1. A process for the preparation of silicon-containing m-carboranes which comprises heating at a temperature of from about 290° C. to 375° C. an o-carborane compound of the formula:

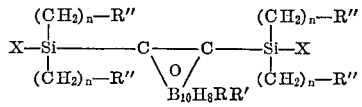

wherein X is a halogen selected from the group consisting of chlorine, fluorine, bromine and iodine; R and R′ are each selected from the group consisting of hydrogen and alkyl of from 1 to 5 carbon atoms; R″ is selected from the group consisting of alkyl of from 1 to 12 carbon atoms and the radical:

wherein R‴ is selected from the group consisting of hydrogen and alkyl off from 1 to 5 carbon atoms; $n$ is an integer of from 0 to 1 inclusive, and with the proviso that when $n$ is 0 when R″ is alkyl; the said compound having a melting point below about 290° C.

2. The process of claim 1 wherein the said compound is heated at a pressure of from atmospheric to about 100 p.s.i.

3. The process of claim 1 wherein the said compound is bis(chlorodimethylsilyl)-o-carborane.

4. The process of claim 3 where the said compound is heated at reflux temperature.

References Cited

UNITED STATES PATENTS

| | | |
|---|---|---|
| 3,366,656 | 1/1968 | Papetti. |
| 3,366,657 | 1/1968 | Papetti. |
| 3,366,658 | 1/1968 | Papetti. |
| 3,366,659 | 1/1968 | Papetti. |
| 3,374,258 | 3/1968 | Papetti. |
| 3,374,259 | 3/1968 | Papetti. |

OTHER REFERENCES

Grafstein et al., "Inorganic Chemistry," 2, December 1963, pp. 1128–1133.

TOBIAS E. LEVOW, Primary Examiner.

P. F. SHAVER, Assistant Examiner.

U.S. Cl. X.R.

260—46.5, 606.5